United States Patent [19]
Vogelsang

[11] Patent Number: 4,921,079
[45] Date of Patent: May 1, 1990

[54] HYDRODYNAMIC RETARDER

[75] Inventor: Klaus Vogelsang, Crailsheim, Fed. Rep. of Germany

[73] Assignee: Voith Turbo GmbH, Fed. Rep. of Germany

[21] Appl. No.: 216,638

[22] Filed: Jul. 8, 1988

[30] Foreign Application Priority Data

Jul. 8, 1987 [DE] Fed. Rep. of Germany ....... 3722477

[51] Int. Cl.$^5$ .................... B60T 1/087; B60T 10/02; F16D 57/04
[52] U.S. Cl. ..................... 188/296; 60/330; 415/52.1
[58] Field of Search ................. 188/290–296, 188/264 E; 60/330, 334, 341, 343, 351, 348, 347, 364, 363, 367; 74/778, 779, 790, 791, 793; 192/3.23, 4 B, 58 A, 58 B, 58 R, 12 A, 3.34; 416/180, 223 A, 223 B; 415/52, 53 T, 53 R, 55, 213 T, 52.1, 53.1–53.3; 303/3, 2

[56] References Cited

U.S. PATENT DOCUMENTS

| | | |
|---|---|---|
| 1,867,652 | 7/1932 | Burks .................. 415/213 T |
| 2,126,751 | 8/1938 | Mater .................. 188/296 |
| 3,359,908 | 12/1967 | Toma .................. 415/213 T |
| 3,768,920 | 10/1973 | Gerwih .................. 415/213 T X |
| 3,782,514 | 1/1974 | Mueller .................. 188/296 |
| 3,860,097 | 1/1975 | Braschler et al. .................. 60/330 X |
| 3,945,473 | 3/1976 | Prather et al. .................. 188/296 |
| 4,043,434 | 8/1977 | Braschler .................. 188/296 |
| 4,051,931 | 10/1977 | Vignon .................. 188/296 |
| 4,084,374 | 4/1978 | Schlitz .................. 188/296 X |
| 4,411,340 | 10/1983 | Brosius et al. .................. 188/296 |
| 4,458,792 | 7/1984 | Thomas et al. .................. 188/296 |

FOREIGN PATENT DOCUMENTS

| | | |
|---|---|---|
| 1675246 | 11/1970 | Fed. Rep. of Germany . |
| 1942475 | 3/1971 | Fed. Rep. of Germany ...... 188/296 |
| 3511795 | 3/1985 | Fed. Rep. of Germany . |
| 2230236 | 12/1974 | France .................. 188/296 |
| 734024 | 7/1955 | United Kingdom .................. 188/296 |

*Primary Examiner*—Douglas C. Butler
*Attorney, Agent, or Firm*—Ostrolenk, Faber, Gerb & Soffen

[57] ABSTRACT

A hydrodynamic retarder with a stator blade wheel and a rotor blade wheel whose blades together fill the work chamber for working liquid. Slot shaped inlet openings permit entrance of working liquid to the working chamber. The inlet openings are located at the radially inner region of the rotor blade wheel toward the retarder shaft. Slot shaped outlet openings permit outlet of working fluid. The outlet openings are at the radially outer region of the rotor blade wheel. The slots are oriented to follow the incline of the blades of the rotor blade wheel. The inlet slots each trail a respective rotor wheel blade while the outlet slots each lead that blade in the movement direction of the rotor blade wheel. Particular thicknesses of blades and particular angular sizes of the inlet and the outlet slot openings are disclosed.

22 Claims, 1 Drawing Sheet

HYDRODYNAMIC RETARDER

BACKGROUND OF THE INVENTION

The present invention relates to a hydrodynamic retarder including a rotor on a shaft, a stator, and a toroidal work chamber, in which the rotor and the stator are hydrodynamically coupled by respective blade wheels on the rotor and the stator located in the work chamber. The invention particularly relates to means for filling and emptying the work chamber.

Particularly when the hydrodynamic retarders are used in automotive vehicles or in systems with strongly varying operation, such retarders are connected and disconnected by filling and emptying the work chamber. For this purpose, working liquid is fed through suitable channels and past a prior control device to the work chamber or work space of the retarder. Removal of the working liquid from the work chamber is preferably radially outward via a slot located between the rotor and stator blade wheels.

Federal Republic of Germany Patent No. 35 11 795 discloses a hydrodynamic retarder in which the working liquid is introduced through channels in the blades of the stator directly into the so-called core ring of the retarder. There the lowest pressure prevails within the flow. As a rule, there is a hollow space that is not filled by the working liquid in the core ring even during operation, so that the retarder can be filled from a filling pump with only a slight expenditure of energy. The channels necessary for filling the work space are either cast directly into the blading or are subsequently welded therein. In either case, a channel path through the blades is connected, producing a sensitive local thickening of the blades in question. This leads to a considerable disturbance in the flow through the blading.

A hydrodynamic retarder is known from U.S. Pat. No. 2,126,751 in which feeding of the work liquid is effected via plates which are provided with slots, and the plates are arranged turnably on both sides of the stator blade wheel. The slots are of different widths. Depending upon the position of rotation of the plates, the slots come into alignment with channels which are cast into the blading of the stator blade wheel. However, these are control slots for dosaging the amount of working liquid flowing to the retarder and are not working liquid inlet or outlet slots.

Federal Republic of Germany Application DE-OS 16 75 246 discloses a retarder having blades which are also free of channels for the filling or emptying of the work space. The working liquid passes through an annular slot formed between the blade wheels and into the work space, and the liquid emerges from the work space via a similar slot arranged radially on the outside. The passage of the flow from one blade wheel to the other thus results in a considerable disturbance in the flow.

One skilled in the art knows that even in the case of a retarder whose flow is completely converted into heat by eddying, the power that is absorbed and the braking torque that is developed can be increased if the blading results in a flow which is as free of surges and is as undisturbed as possible. In the case of cast channels, this means careful rounding out of the differences in the thickness of the blades, and that in turn means an increased expense for material and a greater weight. In the case of welded channels, a flow favorable development within the thickness of the blade can be obtained only at a very particularly high manufacturing expense.

SUMMARY OF THE INVENTION

The object of the present invention is to improve the known hydrodynamic retarder in such a manner than an even higher braking power can be obtained, together with the possibility of simpler manufacture.

A further object is to improve the entrance and exit of working liquid in the working chamber of the hydrodynamic retarder.

The invention comprises a hydrodynamic retarder. As conventional, it includes a housing defining a torus shaped work chamber. A stator blade wheel with blades extending into the work chamber is supported in the housing. A rotor blade wheel is also supported in the housing. It includes blades in the work chamber which extend toward the blades of the stator blade wheel. The rotor blade wheel is supported for rotating on a shaft. The invention particularly concerns the openings through which the work chamber is filled and from which the work chamber is emptied.

For filling and emptying the work chamber, elongated working liquid inlet slots and working liquid outlet slots are provided on at least one of the two blade wheels, and preferably on the rotor blade wheel. The inlet or filling slots are located in the radially inner region of the respective blade wheel. The outlet or emptying slots are located in the radially outer region of the same blade wheel. The slots or openings are permanently open. In this way, the blades are free of the blade thickenings that result from the prior art filling or emptying channels, as these thickenings affect the flow of the liquid over the blades. The blade wheels have their full cross-sectional profiles opposite each other, so that the flow can pass, as free of surges as possible, from one blade wheel to the other.

The present invention reduces disturbances like those experienced with the retarder of the German Application DE OS 16 75 246 to a minimum and assures the development of optimal braking power. This is because the rear torus shaped surface of the chambers formed by two blades is not interrupted by slots or, for instance, circular holes. The slot like development of the inlet or filling openings and the outlet or emptying openings of the invention disturbs the flow rushing between two adjacent blades on the one slotted wheel only minimally, namely, only in that circumferential region which corresponds to the circumferential width of the slots.

The filling and emptying slots are preferably arranged on the rotor blade wheel. The inlet or filling slots are arranged behind or trailing the corresponding blades, as seen in the direction or rotation, on the radially inner region of the work chamber, while the outlet or emptying slots are arranged in front of or leading the corresponding blades, as seen in the direction of rotation, in the radially outer region of the work chamber. The slots, in this connection, follow in each case the orientation direction of the blades and are directed substantially radially. The blades themselves are at an inclined orientation with respect to the axis of the work chamber and the axis of the retarder, and the rotor blades are inclined in the leading direction leading the motion of the rotor wheel.

The number of inlet or filling slots depends primarily on how fast the retarder is to be filled, while the number of outlet or emptying slots depends on the braking power to be developed, i.e., on the liquid throughput necessary for the removal of the braking heat developed. A favorable distribution of the slots is obtained if a filling and an emptying slot are respectively arranged behind and in front of each second blade (that is, alternate blades) of the rotor wheel. There are preferred angular regions for the arrangement of the slots within the profile cross-section of the rotor blade wheel, and preferred ratios between the radial length of the profile cross-section, the thickness of the blade, and the width of the slots.

A labyrinth packing which is free of contact with the retarder housing is arranged on the rear side of the rotor blade wheel facing the retarder housing, in the circumferential region between the filling and emptying slots. In this way, passage of working liquid from the radially inner region to the radially outer region of the rotor blade wheel on the outside of the rotor blade wheel is to be prevented.

Other objects and features of the invention are described with reference to an embodiment shown in the drawings.

DESCRIPTION OF THE PREFERRED EMBODIMENTS

Figure 1:
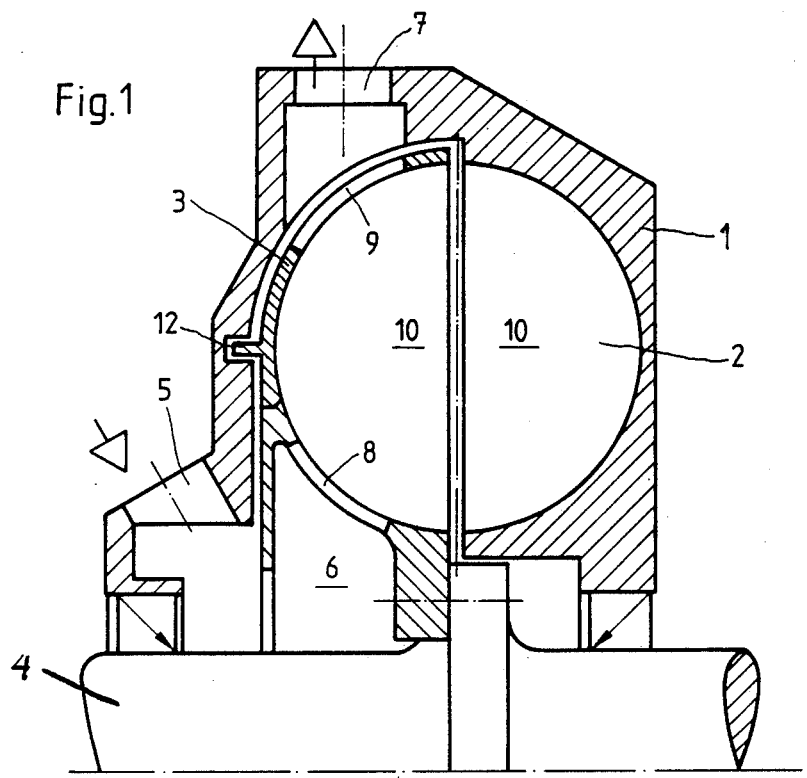
FIG. 1 is a digrammatic longitudinal section through part of a hydrodynamic retarder, including the invention.

FIG. 1 shows a hydrodynamic retarder including a housing 1 having a torus shaped stator blade wheel 2 fixed in the housing 1 against rotation. There are blades on the stator blade wheel which extend over the full radial height of the torus shape and extend axially out from the axial outside of the wheel toward the rotor blade wheel. Opposite the stator blade wheel in the housing 1 of the retarder, there is a torus shaped rotor blade wheel 3 which is fastened on a retarder shaft 4. There are blades on the rotor blade wheel which extend over the full radial height of the torus shape and extend axially out from the axial outside of the wheel toward the stator blade wheel.

The two blade wheels and their blades are shaped to together substantially fill a torus-shaped work space or work chamber 10 in which both blade wheels are disposed. The blades extend near to each other, but do not interfere with their passage past each other. Each blade wheel terminates at an axial normal plane defined by the face side or edge of all of its blades.

Figure 3:
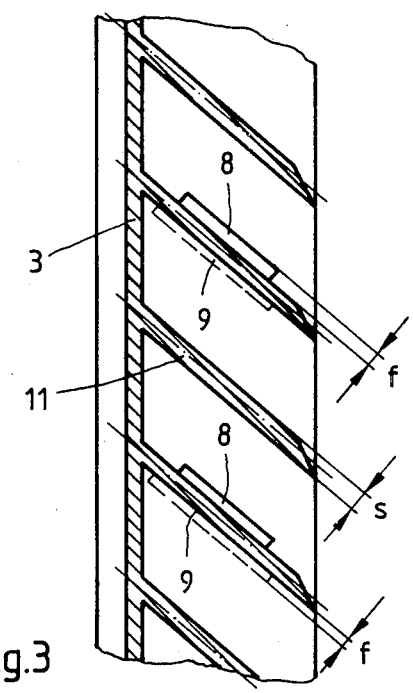
FIG. 3 is a cylindrical section through the blading of the rotor blade wheel, along the line III in FIG. 2.

The working liquid is first fed to the retarder through a feed channel 5 via a control device (not shown) in a radially inward, annular distributor space 6 wrapped around the shaft 4. From the space 6, the liquid passes through the work chamber 10, and then is removed through an outlet channel 7. On the rotor blade wheel 3, there are inlet or filling slots 8 in the radially inner region close to the distributor space 6, and there are outlet or emptying slots 9 in the radially outer region. Each of those slots extends over a given angular region. As seen in FIG. 3, each slot is obliquely inclined to the axis of the retarder to follow the direction of the rotor blades 11. The torus shaped work chamber or space 10 between the rotor blade wheel 3 and the stator blade wheel 2 is filled and emptied via the filling and emptying slots 8 and 9.

Figure 2:
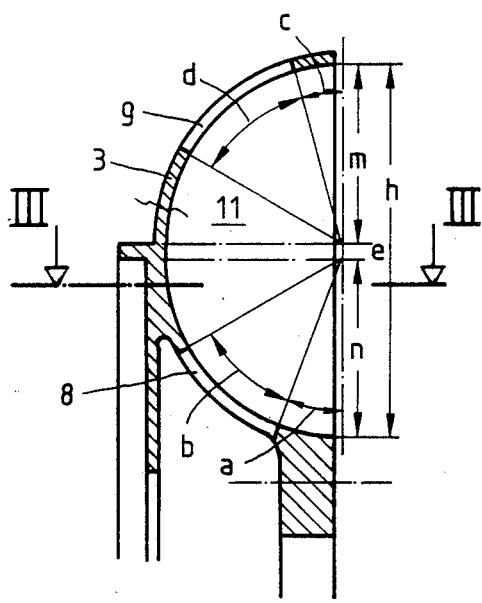
FIG. 2 is a longitudinal section through part of the rotor blade wheel of the retarder.

FIGS. 2 and 3 show the rotor wheel in a longitudinal section and in a cylindrical section. The rotor blade wheel can be viewed as a hollow, half torus shaped shell with an array of angled blades, as seen in FIG. 3, spaced around the shell, and each blade extends completely across the half torus shaped shell. As seen in FIG. 3, the blades 11 are inclined to the axis of the retarder, and particularly inclined in a leading direction, that is they are directed toward the direction in which the rotor blade wheel moves, that is down in FIG. 3, and away from the axial outer side of the rotor blade wheel.

The slots 8 and 9 are openings through the shell of the rotor blade wheel. The filling slots 8 commence after an angle a of between 15° and 30° from the radial bottom of the rotor at the open face side of the rotor blade wheel 3. The slots 8 have an angular length over an arc of an angle b which is between 30° and 60°. Similarly, the outlet or emptying slots 9 arranged in the radially outer profile region start after an angle c of between 10° and 20° from the radial top of the rotor at the open face side. The slots 9 have an angular length over an arc of an angle d between 30° and 60°. The filling slots 8 are each cast behind or trailing a rotor blade 11, while the emptying slots 9 are each cast in front of or leading a blade 11, in each case seen in the direction of rotation.

The width f of each of the filling and the emptying slots 8 and 9 is about one to three times the thickness s of the rotor blade 11. The ratio of the blade thickness s to its radial profile height h, that is, its height in the radial direction of the retarder, is between 1:30 and 1:35, and preferably 1:32. The radial profile height h is formed of a radially outer arcuate region m, a radially inner arcuate region n, and a flat intermediate region e. The ratio of the height of region e to the total profile height h is about 1:20. A labyrinth packing arrangement is indicated at 12, which is arranged around the circumference of the axially outer surface of the rotor blade wheel, between the inlet openings and the outlet openings, and extends from the rotor blade wheel to form a labyrinthine arrangement with the housing while being free of contact with the housing. The labyrinth packing prevents passage of working liquid from the radially inner region to the radially outer region around the outside of the rotor blade wheel.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A hydrodynamic retarder comprising:
   a housing defining a torus shaped work chamber;
   a stator blade wheel supported in the housing, including blades extending into the work chamber and fixed against rotation around the housing;
   a rotor blade wheel in the housing including blades extending into the work chamber and which extend toward the blades of the stator blade wheel; a shaft on which the rotor blade wheel is supported for rotating; the stator blades and the rotor blades together generally filling the torus shaped work space of the work chamber;
   a set of slot-shaped inlet filling openings in at least one of the rotor blade wheel and the stator blade wheel for filling the work chamber with work liquid; a pathway in the housing for delivering work liquid to the inlet openings; and spaced from the inlet filling openings, a set of slot-shaped outlet openings provided on at least one of the stator blade wheel and the rotor blade wheel for emptying the work chamber of work liquid; means for conducting work liquid away from the outlet openings from the work space; said inlet and outlet openings being near and along respective blades of the wheel in which said openings are formed, so that the surfaces of the wheel between said blades are substantially uninterrupted by said openings, so that the radial flow of work liquid between said blades is substantially undisturbed.

2. The hydrodynamic retarder of claim 1, wherein the inlet openings and the outlet openings are defined in the rotor blade wheel.

3. The hydrodynamic retarder of claim 2, wherein the openings are permanently open openings.

4. The hydrodynamic retarder of claim 2, wherein the inlet openings are each located near and behind a corresponding one of the rotor blades, trailing the respective blade in the direction of rotation.

5. The hydrodynamic retarder of claim 4, wherein the rotor blade wheel has a radially inner region toward the shaft, the inlet openings being located at the radially inner region of the rotor blade wheel.

6. The hydrodynamic retarder of claim 4, wherein the outlet openings are each located near and in front of a corresponding one of the blades of the rotor blade wheel, leading the respective blade in the direction of rotation.

7. The hydrodynamic retarder of claim 6, wherein the rotor blade wheel has a radially outer region away from the shaft, the outlet openings being located in the radially outer region of the rotor blade wheel.

8. The hydrodynamic retarder of claim 2, wherein the rotor blade wheel has a radially inner region toward the shaft, the inlet openings being located at the radially inner region of the rotor blade wheel; and the rotor blade wheel has a radially outer region away from the shaft, the outlet openings being located in the radially outer region of the rotor blade wheel.

9. The hydrodynamic retarder of claim 8, wherein the blades of the rotor blade wheel are inclined to the axis of the retarder, and from their sides away from the stator blade wheel to their sides toward the stator blade wheel, the blades are inclined in a leading direction of the motion of the rotor blade wheel.

10. The hydrodynamic retarder of claim 9, wherein the inlet openings and the outlet openings extend generally in the direction of the blades of the rotor blade wheel.

11. The hydrodynamic retarder of claim 9, wherein the inlet openings are each located near and behind a corresponding one of the rotor blades, trailing the respective blade in the direction of rotation; the outlet openings are each located near and in front of a corresponding one of the rotor blades, leading the respective blade in the direction of rotation.

12. The hydrodynamic retarder of claim 7, wherein the inlet openings and the outlet openings are arrayed circumferentially around the rotor blade wheel at alternate blades thereof, such that there is both an inlet opening and an outlet opening at said alternate ones of the blades thereof and no openings at the adjacent blades.

13. The hydrodynamic retarder of claim 7, wherein starting from an axial normal plane defined by the face side of the rotor blade wheel; angularly outward from the plane along the rotor blade wheel a distance of between 15° and 30°, the inlet openings begin and the inlet openings continue over a further angle of between 30° and 60°.

14. The hydrodynamic retarder of claim 13, wherein angularly outward from the face side an angular distance of between 10° and 20°, the outlet openings begin and the outlet openings continue over a further angle of between 30° and 60°.

15. The hydrodynamic retarder of claim 7, wherein angularly outward from the face side an angular distance of between 10° and 20°, the outlet openings begin and the outlet openings continue over a further angle of between 30° and 60°.

16. The hydrodynamic retarder of claim 14, wherein each of the inlet openings and the outlet openings has a thickness that is in the range of one to three times the thickness of the respective blade of the rotor blade wheel.

17. The hydrodynamic retarder of claim 6, wherein each of the inlet openings and the outlet openings has a thickness that is in the range of one to three times the thickness of the respective blade of the rotor blade wheel.

18. The hydrodynamic retarder of claim 17, wherein the work chamber has a profile from the radially inward side to the radially outward side which profile is comprised of a radially outer arcuate region, a radially inner arcuate region and an intermediate flat region, and wherein the flat region has a radial length in the radial direction of the work chamber that is related to the radial length of the work chamber from the radially inner to the radially outer ends of the work chamber in a ratio of about 1:20.

19. The hydrodynamic retarder of claim 18, wherein the thickness of a blade of the rotor blade wheel is related to the radial length from the radially inner end to the radially outer end of the work chamber in a ratio of between 1:30 and 1:35.

20. The hydrodynamic retarder of claim 19, wherein the ratio of the thickness of the blade to the radial length from the radially inner to radially outer ends of the work chamber is 1:32.

21. The hydrodynamic retarder of claim 6, wherein the thickness of a blade of the rotor blade wheel is related to the radial length from the radially inner end to the radially outer end of the work chamber in a ratio of between 1:30 and 1:35.

22. The hydrodynamic retarder of claim 8, further comprising a labyrinth packing extending circumferentially around the rotor blade wheel and disposed angularly between the inlet openings and the outlet openings, which extends in labyrinth form into the housing and which is free of contact with the housing.

* * * * *